F. R. LOCKHART AND H. J. ORD.
MOTION PICTURE FILM FEED MECHANISM.
APPLICATION FILED JULY 19, 1916. RENEWED JULY 15, 1918.
1,328,382. Patented Jan. 20, 1920.
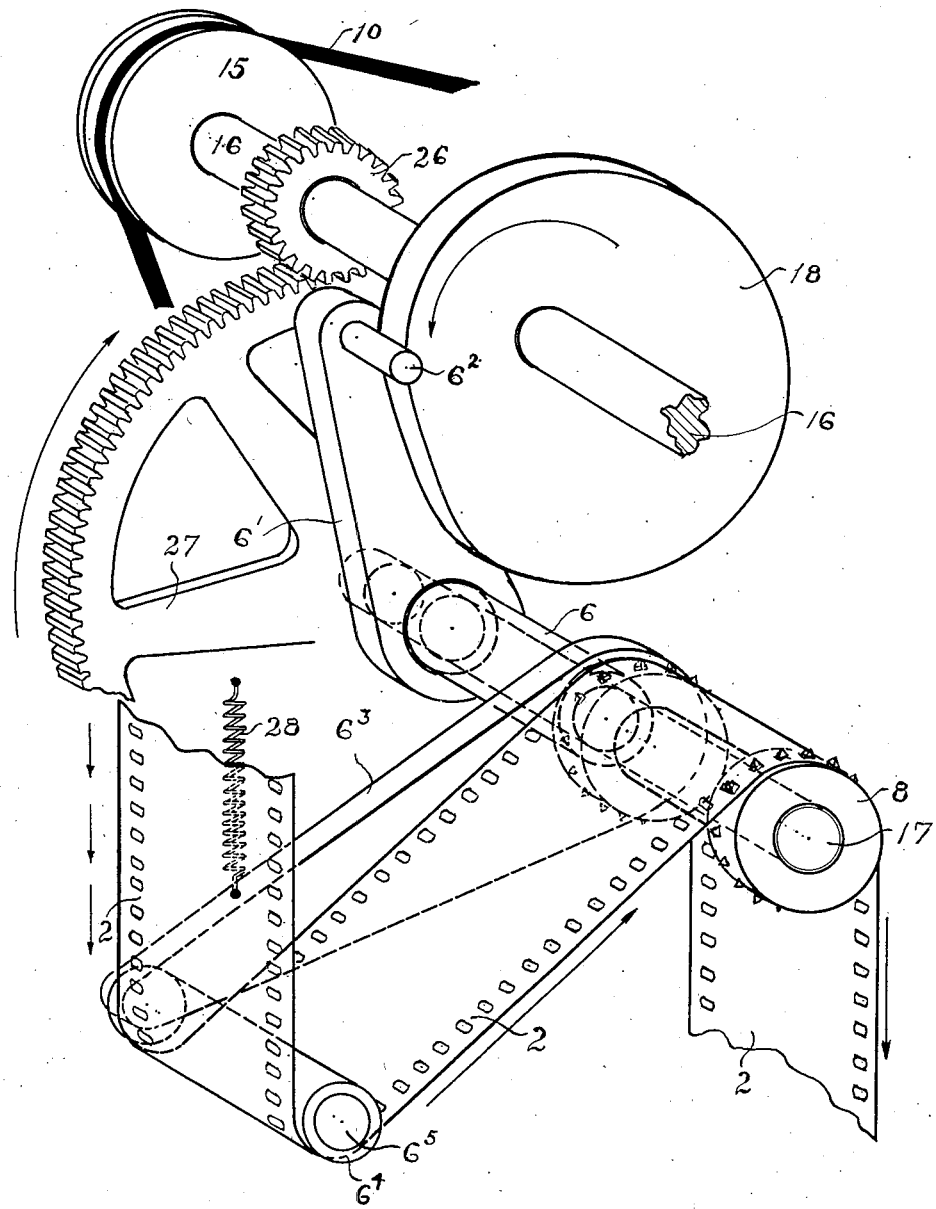
Witnesses:-
Leslie S. Baines.
Inventors,
Frederick R. Lockhart
Harry G. Ord
by Wm. J. Heedman
atty.

UNITED STATES PATENT OFFICE.

FREDERICK R. LOCKHART AND HARRY J. ORD, OF TORONTO, ONTARIO, CANADA, ASSIGNORS TO FRANK M. BEESLEY, OF TORONTO, ONTARIO, CANADA.

MOTION-PICTURE-FILM-FEED MECHANISM.

1,328,382.  Specification of Letters Patent.  Patented Jan. 20, 1920.

Application filed July 19, 1916, Serial No. 110,077. Renewed July 15, 1918. Serial No. 245,075.

*To all whom it may concern:*

Be it known that we, FREDERICK R. LOCKHART, a citizen of the Dominion of Canada, and a resident of Toronto, county of York, and Province of Ontario, Canada, and HARRY G. ORD, a citizen of the Dominion of Canada, and resident of Toronto, county of York, and Province of Ontario, have jointly invented a new and useful Improvement in Motion-Picture-Film-Feed Mechanisms, of which the following is a specification.

Our invention relates to motion picture cameras and projectors and pertains specifically to the film feeding mechanisms of such devices.

The principal objects of our invention comprise providing an intermittent film feed mechanism of great simplicity, that the cost of manufacture may be reduced, of such nature that wear of moving parts is automatically compensated to eliminate lost motion and noise, and further to provide a mechanism in which the wear on the film is minimized and one that is free from vibration in operation.

We accomplish these and other desirable features which will hereinafter be pointed out by the novel and improved mechanism disclosed in the specification and illustrated in the drawing.

In the drawing which accompanies and forms a part of this specification we have illustrated in isometric perspective only that portion of the mechanism of a motion picture camera or projector necessary for a complete disclosure of our improved feeding mechanism.

Referring now to the drawing, we provide a pair of shafts 16 and 17 adapted to rotate at predetermined and definite speed ratio with each other by means of the gears 26 and 27. Shaft 16 carries the smaller of the two gears 26 while shaft 17 carries the larger gear 27. A pulley 15 is provided on shaft 16 and is belted by means of a belt 10 to any suitable source of power. The driving means is not essential and the device may be driven by hand by providing a crank upon shaft 17. In practice we prefer to so proportion the gears 26 and 27 to each other that shaft 16 makes five revolutions while shaft 17 makes one.

A rocker arm composed of the sleeve 6, arm $6^1$ bearing the cam follower $6^2$, and arm $6^3$ bearing a film beater composed of a stud $6^5$ and roller $6^4$, is loosely sleeved over shaft 17 and is free to rotate thereon. A film sprocket 8, provided with the usual number of teeth, in the heads as indicated, to engage a standard motion picture film, is solidly united to shaft 17 and rotates therewith. The sprocket is so positioned on shaft 17 as to act, in conjunction with the gear 27, to maintain the rocker arm in definite longitudinal position on the shaft.

A motion picture film 2, that portion of which after leaving the feed roll and passing through the film gate and before entering the take up reel, is shown in the drawing, passing under the collar $6^4$ carried by the stud $6^5$ on the arm $6^3$ and thence over the sprocket 8. The sprocket 8 draws the film, from the feed roll, not shown in the drawing, through the film gate, not shown in the drawing, under the film beater $6^4$ and feeds the film to the take up reel, an operation well known in the art.

The shaft 16 carries solidly united therewith a cam 18 and pin $6^2$ carried by arm $6^1$ of the rocker arm is maintained in contact with the surface of the cam by means of the spring 28. Thus as the cam 18 carried by the shaft 16 makes five complete revolutions while the sprocket wheel 8 carried by shaft 17 makes one revolution, it is obvious that the cam may be cut to cause the film beater to rise and fall five times during one revolution of the film sprocket. It is further obvious that the cam surface may be cut with such outline as to cause the film beater to rise substantially at a rate commensurate with the speed of the sprocket and so keep the beater in contact with the film at all times, and yet cause that portion of the film in the film gate to remain stationary, during the interval occupied by the beater in rising. Again it is obvious that the cam may be further formed to cause the beater to be suddenly depressed to cause the film to be drawn through the gate at a considerably higher rate of speed than the sprocket moves the same. The particular design of the cam surface is not essential to our invention and we do not wish to be limited to any particular ratio between the time interval occupied by the rise of the beater and the time interval occupied by the fall of the beater, nor do we wish to be limited to the particular ratio illustrated by the cam in the drawing.

In practice we so design the cam 18 as to cause the film beater 6⁴ to rise during ⅘ of a revolution of the cam and to be depressed during ⅕ of a revolution of the cam. In this way we maintain the film stationary in the film gate for ⅘ of a revolution of the cam and move the film out of the gate in ⅕ of the revolution of the cam. Therefore as the cam rotates five times while the sprocket wheel is revolving once, five pictures of a standard motion picture film are each allowed to remain stationary in the film gate for ⅘ of a period and to be in motion for ⅕ of a period.

It will be observed from the foregoing that the nature of the mechanism is such that wear is automatically compensated because the surface of the cam wears evenly and the spring 28 maintains the cam follower in contact with the cam irrespective of the wear on the cam. It will be further observed that the mechanism is simple and rugged, that the nature of the mechanism is such as to minimize wear and tear on the film because as the beater is never out of contact with the film the film is not struck a sudden blow and the tension on the film is substantially uniform at all times, thus tending to increase the life of the film, and further tending to minimize vibration with regard to the operation of the mechanism.

While we have illustrated and described but one embodiment of our invention we desire it to be distinctly understood that we may vary the details thereof without narrowing the scope of the invention.

Having thus described our invention what we claim as new and desire to secure by United States Letters Patent is as follows:

1. In a motion picture film feed mechanism a pair of shafts, a sprocket carried by one of said shafts, a film engaged by said sprocket and moved thereby, a rocker arm sleeved on said shaft, a cam carried by the other of said shafts and adapted to operate said rocker arm to intermittently depress said film.

2. In a motion picture film feed mechanism, a pair of shafts adapted to rotate in definite ratio with each other, a sprocket carried by one of said shafts, a film engaged by said sprocket and moved thereby, a rocker arm sleeved on said shaft, a cam carried by the other of said shafts and adapted to operate said rocker arm to intermittently depress said film a predetermined number of times during one revolution of said sprocket.

3. In a motion picture film feed mechanism, a pair of shafts geared to rotate in definite ratio with each other, a film feed sprocket carried by one of said shafts, a film adapted to be moved by said sprocket at uniform speed, a rocker arm mounted on said shaft, a cam carried by the other of said shafts and adapted while maintaining said rocker arm always substantially in contact with said film to cause said rocker arm to intermittently depress said film at predetermined intervals.

4. A motion picture film feed mechanism comprising a pair of shafts adapted to rotate in definite ratio with each other, a sprocket carried by one of said shafts, a film adapted to be moved at uniform speed by said sprocket, a rocker arm carrying a cam follower and film beater sleeved on said shaft, a cam carried by the other of said shafts and adapted to engage said cam follower to cause said film beater to be maintained always substantially in contact with said film and yet at predetermined intervals to depress said film that the motion of a portion of said film may be rendered intermittent.

5. A motion picture film feed mechanism comprising a pair of shafts geared to rotate in definite ratio with each other, a film driving sprocket carried by one of said shafts, a film engaged by said sprocket and moved thereby at uniform speed, a rocker arm rotatably mounted on said shaft, a cam carried by the other of said shafts and adapted to engage one of the arms of said rocker arm to maintain the other arm of said rocker arm substantially in contact with said film and yet to depress said film intermittently a predetermined number of times during one complete revolution of said sprocket.

Signed by us at Toronto, county of York and Province of Ontario, in the presence of two witnesses.

FREDERICK R. LOCKHART.
HARRY G. ORD.

Witnesses:
 FRANK M. BEESLEY,
 A. B. CAMPBELL.